June 11, 1929.  J. A. BROOKS  1,717,311
CAR SEAT
Filed April 4, 1927    2 Sheets-Sheet 1
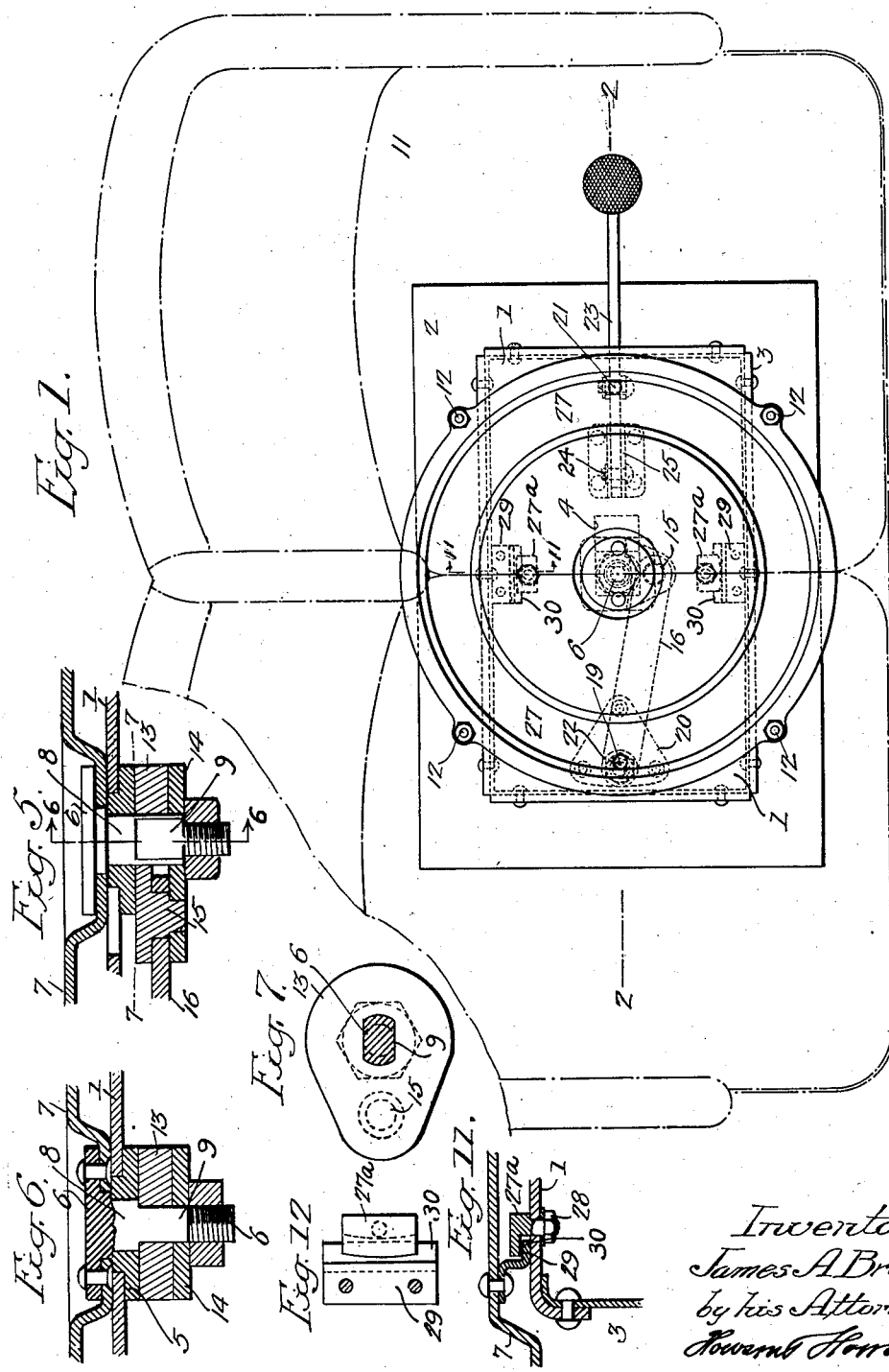
Inventor:-
James A. Brooks.
by his Attorneys,

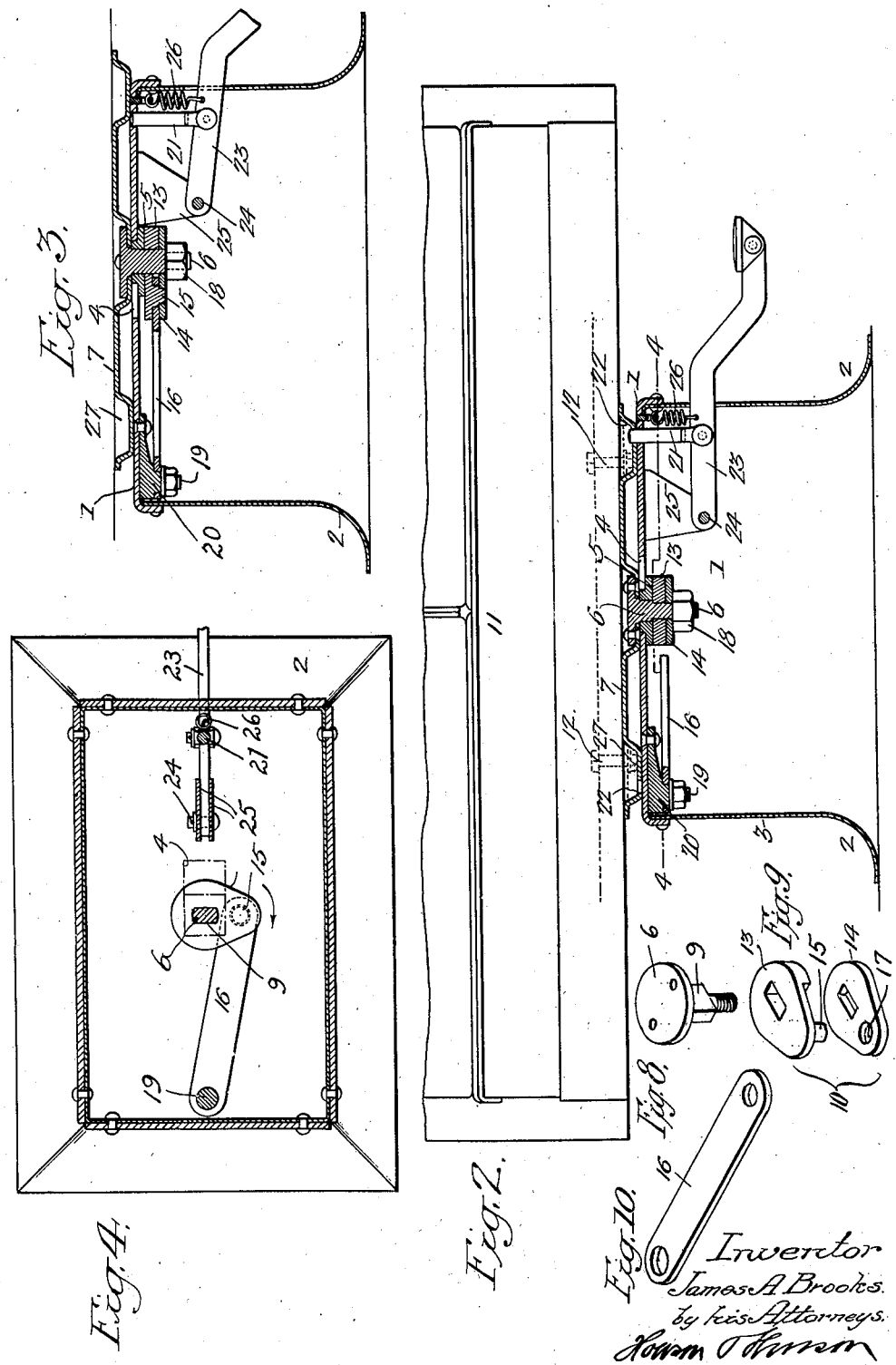

Patented June 11, 1929.

1,717,311

UNITED STATES PATENT OFFICE.

JAMES A. BROOKS, OF KIRKLYN, PENNSYLVANIA, ASSIGNOR TO THE J. G. BRILL COMPANY, OF PHILADELPHIA, PENNSYLVANIA, A CORPORATION OF PENNSYLVANIA.

CAR SEAT.

Application filed April 4, 1927. Serial No. 180,961.

The object of my invention is to so construct a seat structure for passenger cars and other vehicles that the seat can be located close to the side of the car, and can be turned so as to face in either of two directions, the turning movement causing the seat structure to move away from the car side and return when the seat structure has made a one-half revolution.

In the accompanying drawings:

Fig. 1 is a plan view of my improved car seat, the base and seat plate being shown in full lines and the seat structure being shown by dotted lines;

Fig. 2 is a front elevation showing the base and seat plate in section on the line 2—2, Fig. 1;

Fig. 3 is a view similar to Fig. 2, showing the operating lever depressed and the seat structure in position to be turned;

Fig. 4 is a sectional plan view on the line 4—4, Fig. 2;

Fig. 5 is an enlarged sectional view of the pivot, block and crank, on the line 5—5, Fig. 6;

Fig. 6 is a sectional view on the line 6—6, Fig. 5;

Fig. 7 is a sectional plan view on the line 7—7, Fig. 5;

Figs. 8, 9 and 10 are detached views of different parts of the operating mechanism;

Fig. 11 is an enlarged sectional view on the line 11—11, Fig. 1; and

Fig. 12 is a plan view of the lug and cleat shown in Fig. 11.

The base 3 of the seat is rectangular in plan, and the lower portion is flared as at 2 to provide a substantial support for the seat structure. Secured to the base is a platform 1 having a turned-down flange at each side and each end. These flanges are secured to the base by rivets or other fastening devices.

In the platform is an elongated rectangular opening 4 for the pivot of the seat structure. A sliding block 5 is located under the platform, and on the block is a rectangular projection which extends into the opening 4.

Extending through the block 5 is a pivot pin 6, having an enlarged head which rests in a central recess in a seat plate 7. The head of the pin 6 is riveted or otherwise secured to the plate as shown in Fig. 2, so that it turns with the plate.

The portion 8 of the pivot pin which is above the block 5 is round in cross-section as shown in Fig. 5, but the portion 9 beyond the block is flattened or otherwise formed to receive a crank 10, so that the crank must turn with the seat plate and seat structure 11 to which the seat plate is secured by bolts 12 or other fastening means.

The crank 10 is made in two parts 13 and 14 in the present instance. The part 13 is cut away and projecting from this part is a pivot pin 15 for a link 16, the end of the pin extending into an opening 17 in the part 14 (see Figs. 3 and 8).

The two parts of the crank are held together and to the sliding block by a nut 18 on the end of the pivot pin.

The link 16 is pivotally connected to a pin 19 on a bracket 20 secured to the platform near the end of the structure nearest the side of the car.

When the seat structure is turned in the direction of the arrow, Fig. 4, the link 16 causes the block 5 to travel in the elongated opening 4 in the platform 1, thus moving the seat structure away from the side of the car so that it will turn without interfering with the said side.

After the seat structure has been turned a quarter of a revolution, it will be moved towards the side of the car, and when completely turned it will be in its normal position close to the side of the car.

The seat structure is locked in either of its two positions by a locking bolt 21 which extends through an opening in the platform 1 and is arranged to enter either of the openings 22—22 in the seat plate 7.

The locking bolt 21 is pivotally connected to a foot lever 23 which projects through a slot in the base 3. This lever is mounted on a pivot pin 24 carried by brackets 25 depending from the platform 1.

A spring 26 is attached to the lever and to an eye bolt secured to the platform. This spring tends to elevate the bolt and retain it in locking position.

The seat plate 7 is circular in form and has an annular depression 27 which rests upon the platform 1. The openings 22 are in this depressed portion of the seat plate.

At each side of the platform 1 of the base 3 is an undercut lug 27$^a$. Each lug has a screw-threaded stem that passes through a hole in the platform, and on the stem is a nut 28 which securely fastens the lug to the platform.

Secured to the underside of the seat plate 7 are cleats 29. Each cleat has a tongue 30 which is arranged to extend under the undercut portion of the lug 27 when the seat is in either of its two normal positions, as shown in Figs. 1, 11 and 12, preventing the seat tilting on the base. The lugs do not interfere with the movement of the seat around the pivot as the seat is turned, as it is moved away from the side of the car.

I claim:—

1. The combination in a car seat, of a base section; a seat structure; a seat plate secured to said seat structure; a guide in the base; a block adapted to the guide, said seat plate being pivotally mounted on the block and having a crank-arm; and a link connecting the said arm to a pivot on the base, so that when the seat structure is turned it will move the block laterally and allow the seat structure to turn clear of the side of the car.

2. The combination of a base; a seat structure; a seat plate secured to the seat structure and mounted on the base; a pivot pin rigidly secured to the seat plate; a block arranged to slide on the base and through which the pivot pin extends; a crank on the pin; a pivot on the base; and a link connecting the said crank to the pin so that when the seat structure is turned it will be moved laterally to clear the side of the car.

3. The combination of a base having a slotted platform; a block adapted to the slot; a seat structure; a seat plate secured to said seat structure and resting on the platform and having a pivot pin rigidly secured thereto so that it will turn with the seat plate, said pin extending through the block; a crank on the pin; a pivot pin on the base; and a link connecting the said pivot pin with the crank so that on turning the block will be moved into the slot, carrying with it the seat structure.

4. The combination of a base; a platform having a slot therein; a bracket secured to the underside of the platform; a pivot pin on the bracket; a block arranged to slide in the slot in the base, the pivot pin extending through a second block; a crank mounted on said second pivot pin and arranged to turn therewith; a link connecting the crank to the pivot pin on the bracket of the base; a seat plate arranged to turn and slide upon the platform and rigidly secured to the pivot pin extending through the block, and a seat structure secured to the seat plate.

5. The combination in a base having a slotted platform, of a block having a rectangular projection adapted to the slot; a seat structure; a seat plate secured to the seat structure; a pivot pin rigidly secured to the seat plate and extending through the block; a two-part crank mounted on the pin and arranged to turn therewith; a pivot pin on the base; a link connecting the pivot pin with the crank; and means for locking the seat plate in either of its two positions.

6. The combination in a car seat, of a base having a slotted platform; a block arranged to slide in said platform; a seat plate mounted on the platform; a seat structure to which the seat plate is secured; a pivot pin secured to the seat plate and extending through the sliding block; a crank on the pivot pin; a pin on the base; a link connecting the crank with the pin on the base; means for locking the seat plate in either of its two positions; two undercut lugs at each side of the platform of the base; and cleats on the seat plate arranged to engage said lugs and prevent the seat tilting when the seat is in either of its two positions.

7. The combination of a base; a platform mounted thereon having a slot therein; a pin on the base; a block arranged to slide in the slot; a pivot pin; a crank secured to the pivot pin; a link connecting said crank and the pin on the base; a seat plate secured to the pivot pin and mounted to turn and slide upon the platform; a seat structure secured to the seat plate; a locking bolt extending through an opening in the base and into either one of two openings in the seat plate; a foot lever pivoted to the base to which the bolt is attached; and a spring for retaining the bolt in its engaging position.

JAMES A. BROOKS.